Sept. 29, 1953 L. D. MORRILL 2,653,459
FAN BLADE MOUNTING
Filed Dec. 22, 1949
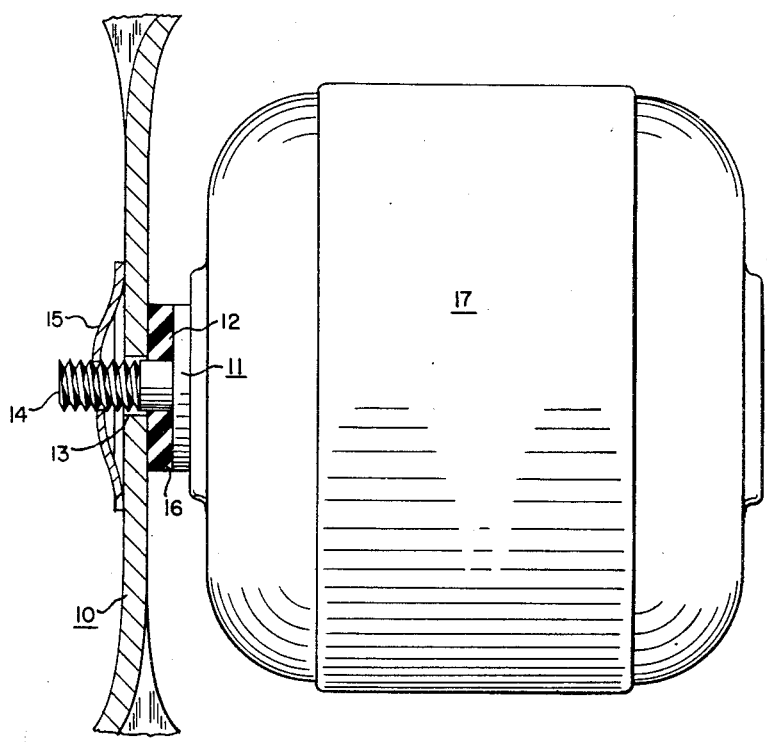
INVENTOR.
LYALL D. MORRILL
BY
Woodling and Kroot
his attys.

Patented Sept. 29, 1953

2,653,459

UNITED STATES PATENT OFFICE 2,653,459

FAN BLADE MOUNTING

Lyall D. Morrill, Fort Wayne, Ind., assignor to Olga B. Morrill

Application December 22, 1949, Serial No. 134,444

4 Claims. (Cl. 64—27)

1

This invention relates to the mounting of fan blades on a shaft of electric motors, and more particularly to the mounting of a driven member on a rotatable driving member.

Manufacturers, for several years, have been working on the mounting of driven members on a rotatable driving member in such manner that axial vibrations of the driving member are not readily transmitted or transferred to the driven member. One particular instance of this activity is in the field of mounting electric fan blades on the shafts of electric motors. It has been shown that a very great improvement in the elimination of noises on small fans can be accomplished by resiliently mounting the fan blade on the motor shaft. Therefore, one of the objects of this invention is to resiliently mount the fan blade on the motor shaft.

Another object of the invention is to resiliently mount a driven member on a rotatable driving member.

A further object of the invention is to dampen or retard the transfer of vibration of the shaft in an axial direction to the fan blades supported thereby.

A still further object of the invention is to dampen and retard the transfer of noises making vibrations of the shaft to the fan blades whereby a quiet running electric fan may be commercially constructed.

Yet a still further object of the invention is to provide a commercially practical, economical and easily assembled fan blade mounting which prevents or retards transfer of vibration from the fan blade supporting shaft to the fan blade.

Other objects and a fuller understanding of this invention may be had by referring to the following description and claims, taken in conjunction with the accompanying drawing in which The single figure is an elevational view partly in cross section to illustrate the mounting of the fan blade on the shaft of the motor.

Many different methods of mounting fan blades on the shaft of a motor have been used. For example, a fan blade has been tightly mounted on the shaft with a metal to metal contact which mounting does not provide a fan which runs quietly. Engineers have for some time tackled this problem to determine how to construct an electric fan which is relatively quiet and does not radiate audible noise. Audible noises from fans sometimes is referred to as "howling" or "whining" and covers a wide range of frequencies within the audible range. It has been found that small gusts of wind hitting the fan blades while they are rotating will often change the pitch of this "whining" or other noise.

To solve these problems, the engineers have completely isolated the fan blade from the shaft by a resilient body which prevents metal to metal contact between the blade and the shaft. The resilient body would dampen the transfer of vibrations from the shaft to the fan blade. In the present instance, it has been found that contrary to that taught by previous resilient mountings, it is not necessary to completely eliminate metal to metal contact between the fan blade and the shaft.

In the present mounting as illustrated in the drawing, a fan blade 10 is resiliently mounted on the shaft 11 of an electric motor 17. These parts may be of any suitable design and construction. The shaft 11 of the motor has an end surface 12 which is disposed in a plane substantially perpendicular to the axis of rotation of the shaft 11. Generally this shaft 11 is the armature or rotor shaft of the electric motor 17. The fan blade 10 has an opening 13 therein through which an extended portion 14 of the shaft 11 extends. This extended portion 14 in the present instance has external threads thereon and has a diameter less than the diameter of the shaft 11. A resilient nut or member 15 engages this extended portion 14 and urges the fan blade 10 toward the end surface 12 of the shaft 11. The fan blade 10 is resiliently spaced from the end surface 12 by a resilient mass or member 16 which may be in the form of a rubber washer. The resilient member 16 cooperates with the resilient fastening member 15 to hold the fan blade on the shaft 11 for rotational movement.

In observing the drawing, it is noted that the extended portion 14 co-axially extends outwardly from the end surface 12 of the shaft 11. Thus, the end surface 12 may be referred to as a shoulder surface extending about the extended portion 14. This extended portion 14 may be integrally joined with the main body portion of the shaft 11 or it may be a separate member carried by the shaft 11. In the present instance, the holding member 15 has been constructed from spring steel providing enough elasticity to permit some axial movement of the extended portion 14 relative to the fan blade 10. An ordinary speed nut stamped from sheet metal has been found very effective for use as a member 15.

Since this mounting of the fan blade on the motor shaft has eliminated the audible noise from the fan, it is reasoned that such audible noise is caused by vibration of the motor shaft in an axial direction. The term "axial direction" is referred to as an endwise vibration of the shaft 11. The cooperation of the resilient member 16, along with the resilient holding member 15, dampens or retards the transfer of endwise vibration of the shaft 11 to the fan blades 10. In many motors, the axial vibration or endwise vibration of the shaft 11 may be caused by the skewing of the motor or an axial displacement. The invention described and claimed herein should not be limited to the aforementioned reasoning as to why the mounting dampens and retards audible noises of the fan.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A fan mounting for a motor driven fan having an axially disposed opening of a given diameter, said mounting comprising a motor driven shaft having first and second co-axial cylindrical portions of different diameters with a shoulder therebetween normal to said axis, threads on said first portion of smaller diameter, said first portion having a diameter slightly less than said given diameter to receive said fan thereon, a resilient washer abutting said shoulder and disposed about said first cylindrical portion, and a nut of spring steel having thread engaging portions engaging said threads and having a face portion engaging said fan about said opening therein, said nut having sufficient elasticity and strength along said axis to maintain a radial spacing between said fan opening and said first cylindrical portion and to press sufficiently tightly against said fan to prevent rotational slippage between said nut, fan, washer and shoulder.

2. A fan mounting for a motor driven fan having an axially disposed opening of a given diameter, said mounting comprising a motor driven shaft having first and second co-axial cylindrical portions of different diameters with a shoulder therebetween normal to said axis, threads on said first portion of smaller diameter, said first portion having a diameter slightly less than said given diameter to receive said fan thereon, a resilient washer having an internal surface disposed about said first cylindrical portion and having first and second parallel faces with said first face abutting said shoulder, said second face disposed to abut said fan, and a nut of spring steel having thread engaging portions engaging said threads and having a face portion engaging said fan about said opening therein, said nut having sufficient elasticity and strength along said axis to maintain a radial spacing between said fan opening and said first cylindrical portion without any resilient material therebetween and to press sufficiently tightly against said fan to prevent rotational slippage between said nut, fan, washer and shoulder.

3. A fan mounting for a motor driven fan having an axially disposed opening of a given area, said mounting comprising a motor driven shaft having first and second coaxial portions of smaller and larger transverse dimensions, respectively, with a shoulder therebetween substantially normal to said axis, engagement means on said first portion, said first portion having a cross-sectional area slightly less than said given area to receive said fan thereon, a resilient washer abutting said shoulder and disposed about said first portion, and an engagement member having means complementary to said engagement means to engage same and having a face portion engaging said fan about said opening therein to urge said fan, washer and shoulder into non-slipping frictional engagement with each other.

4. A fan mounting for a motor driven fan having an axially disposed opening of a given area, said mounting comprising a motor driven shaft having first and second coaxial portions of smaller and larger transverse dimensions, respectively, with a shoulder therebetween substantially normal to said axis, threads on said first portion, said first portion having a cross-sectional area slightly less than said given area to receive said fan thereon, a resilient washer abutting said shoulder and disposed about said first portion, and a nut of springy strip stock having thread engaging portions engaging said threads and having a face portion engaging said fan about said opening therein, said nut having sufficient elasticity and strength along said axis to maintain a radial spacing between said fan opening and said first portion without any resilient material therebetween and to press sufficiently tightly against said fan to prevent rotational slippage between said nut, fan, washer and shoulder.

LYALL D. MORRILL.

References Cited in the file of this patent

UNITED STATES PATENTS

| Number | Name | Date |
|---|---|---|
| 1,237,866 | Burton | Aug. 21, 1917 |
| 1,575,637 | Neth | Mar. 9, 1926 |
| 1,578,785 | Wearn | Mar. 30, 1926 |
| 2,050,542 | Pace | Aug. 11, 1936 |
| 2,070,329 | Brecht | Feb. 9, 1937 |
| 2,097,318 | Dowell | Oct. 26, 1937 |
| 2,104,106 | Swennes | Jan. 4, 1938 |
| 2,156,047 | Arnold et al. | Apr. 25, 1939 |